March 23, 1971  W. WIELAND  3,572,389
HYDRO-PNEUMATIC PRESSURE RESERVOIR
Filed Aug. 14, 1969
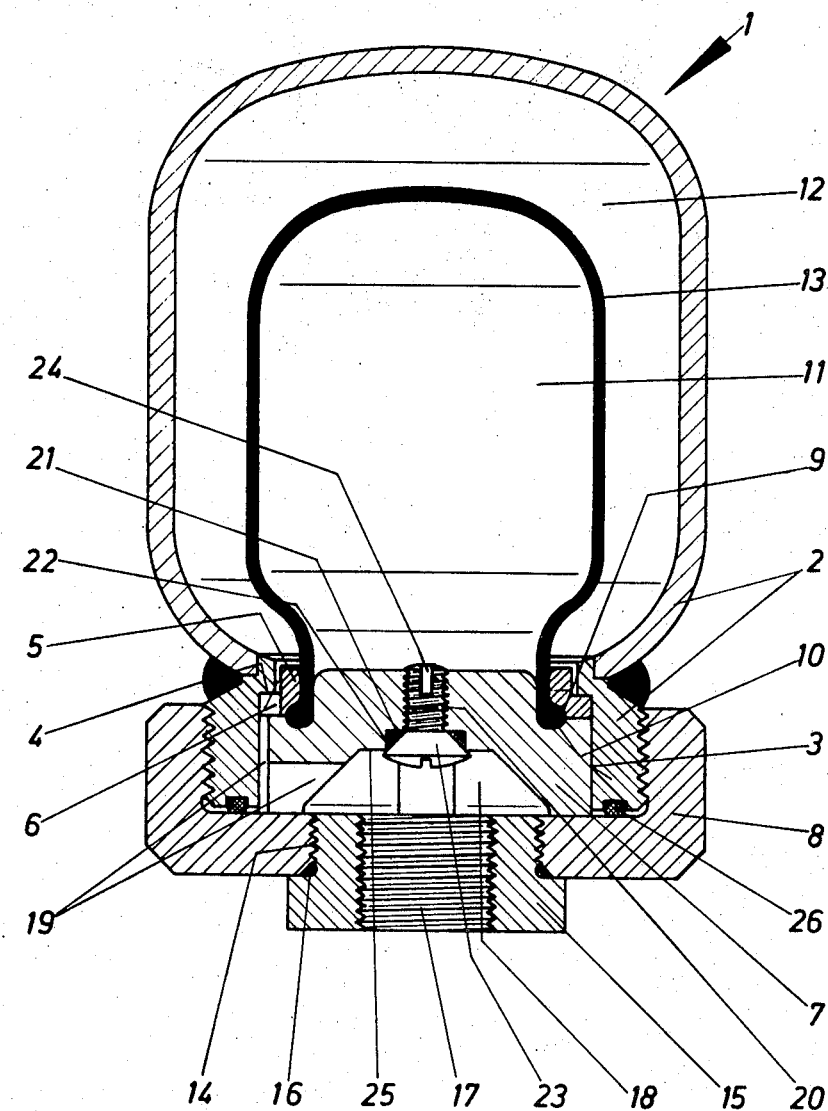
INVENTOR
WALTER WIELAND
BY Holman, Glascock, Downing
& Seebold
ATTORNEYS United States Patent Office 3,572,389
Patented Mar. 23, 1971

3,572,389
HYDRO-PNEUMATIC PRESSURE RESERVOIR
Walter Wieland, Buderich, Germany, assignor to
Langen & Co., Dusseldorf, Germany
Filed Aug. 14, 1969, Ser. No. 850,163
Claims priority, application Germany, Aug. 17, 1968,
P 17 51 917.4
Int. Cl. F16l 55/04
U.S. Cl. 138—30          2 Claims

ABSTRACT OF THE DISCLOSURE

A hydro-pneumatic pressure reservoir in which the housing thereof is provided with an aperture and a movable pliant wall or partition divides the interior of a housing into an outer liquid chamber and an inner gas chamber. The wall is maintained in a liquid and gas type relationship between a clamping ring and a cover which tightly seals the aperture of the housing. The cover is provided with a gas inlet hole having a closure for filling the gas chamber as well as a liquid connection with the liquid connection being in communication with the liquid chamber via channels in the cover and passages between the clamping ring and the housing.

BACKGROUND OF THE INVENTION

Such a pressure reservoir is known, for example, in British Pat. No. 1,084,277 in which the gas filling hole is disposed in the center of the cover and is accessible from the exterior but this arrangement means that the seal serving for sealing the gas filling hole in a gas type fashion is subjected continuously to a pressure drop at least commensurate with the initial gas tension. When the pressure reservoir is stressed dynamically, the pressure drop also assumes changing values which may be higher by a multiple of the values of a pressure reservoir empty of liquid. While the customary seals, such as O-rings can withstand these stresses quite satisfactorily at normal temperatures, difficulties develop at low temperatures of −40 degrees C and below. The sealing material hardens by virtue of the low temperatures and may fracture or break under dynamic stresses. While there are cold-resistant plastic compositions, such compositions are, of course, not suitable for high temperatures since such compositions become too soft and can be squeezed or forced into the smallest gaps.

It is the primary object of the present invention to seal the gas filling hole of pressure reservoirs of the type under consideration in such a fashion that a permanent and reliable seal is realized regardless of the type of stress throughout a wide temperature range which avoids the above disadvantages. Moreover, the seal should be protected against unauthorized manipulation.

SUMMARY OF THE INVENTION

According to the present invention, the problem is solved by providing the cover on its surface facing away from or remote from the gas chamber with a liquid chamber communicating with a liquid connection or equivalent channel for the purpose of pressure equalization thereby assuring that the cover is subjected to no pressure drop during the operation of the reservoir since the pressures in the liquid connection and in the gas chamber are substantially the same.

While German Pat. No. 1,198,148 discloses a pressure reservoir having a gas filling valve charged by the gas pressure on the one hand and by the liquid pressure on the other hand, the purpose of the gas filling valve is not for obtaining as effective a seal as is possible but rather for improving the strength of the pressure reservoir. For this purpose, the gas filling valve is mounted in a closure plate connected with the separative wall with the pressure plate preventing the wall from being forced out through the liquid connection due to the gas pressure upon the emptying of the reservoir of liquid. However, such an arrangement aside from the difference in the problems presented, is not feasible in a pressure reservoir of the type under consideration from a structural viewpoint unless an additional opening in the housing, which weakens the strength of the pressure reservoir, is present.

To accomplish the salient and other objects of the invention, the invention is directed to a hydro-pneumatic pressure reservoir including a housing having an opening, a movable pliant partition within the housing dividing the interior thereof into an outer liquid chamber and an inner gas chamber, a clamping ring and cover tightly sealing the housing opening with the partition being maintained in a liquid and gas type fashion between the ring and cover, the cover having a gas filling aperture through which gas is introduced into the gas chamber, a closure for the gas filling aperture, the cover also being provided with a liquid connection which communicates with the liquid chamber via channels in the cover and passages between the clamping ring and housing, and the closure for the gas filling aperture at its side facing away from the gas chamber terminating in a liquid chamber communicating with the liquid connection for the purpose of pressure equalization.

Further objects and advantages of the invention will become more readily apparent to persons skilled in the art from the following detailed specification and annexed drawing in which drawing:

BRIEF DESCRIPTION OF THE DRAWING

The sole figure is a vertical sectional view of a hydro-pneumatic pressure reservoir embodying the invention.

DETAILED DESCRIPTION OF THE INVENTION

A hydro-pneumatic pressure reservoir denoted generally 1 includes a housing 2 provided with an opening 3 having a shoulder 4 serving as a stop for a clamping ring 5. It will be noted that the clamping ring 5 is so shaped that passages 6 spaced about its circumference originate between the ring 5 and the housing 2. A cover 7 urged against the clamping ring 5 by a nut 8 threaded onto the housing 2 serves for fastening or securing the clamping ring 5.

In an annular gap or hiatus 9 located between the cover 7 and the clamping ring 5 a thickened rim 10 of a separating wall 13 of pliant material is tightly retained and the wall divides the interior of the housing 2 into an inner gas chamber 11 and an outer liquid chamber 12. The nut 8 is formed with a central tapped aperture 14 into which is threaded an adaptor 15 and a suitable seal 16 is provided between the tapped hole and the adaptor. The adaptor 15 is provided with a threaded liquid connection 17 which terminates in a liquid chamber 18 located in the cover 7 and the chamber 18 via channels 19 in the cover communicates with the passages 6.

Furthermore, the cover 7 is formed with a gas filling aperture 20 which connects the liquid chamber 18 with the gas chamber 11. The filling aperture is also provided with a counterbore 21 in which is positioned a packing 22. In cooperation with the packing 22, a fillister headed screw 23 serves for sealing the gas filling aperture 20 and the screw is formed with an axially extending groove 24. When the headed screw 23 is unthreaded, the groove 24 establishes a connection between the gas chamber 11 and the liquid chamber 18 located in the cover. A smooth surface 25 which surrounds the counterbore 21 functions to receive tightly a filling device (not shown) and the gap or hiatus between the nut 8 and the housing 2 is sealed by a seal component 26.

In order to assemble the pressure reservoir 1, the clamping ring 5 is first inserted into the housing 2 until it rests against the shoulder 4 after which the wall or partition 13 is forced through the clamping ring and is suspended by its thickened rim 10. The cover 7 is then inserted and forced against the clamping ring 5 by the manipulation of the nut 8 and in effecting this operation, the rim 10 is tightly wedged. The packing 22 is positioned into the counterbore 21 and the headed screw 23 threaded into the gas filling aperture 20 sufficiently far for a connection between the groove 24 and the liquid chamber 18 still to exist. A filling device is sealed, placed on the surface 25 and compressed gas is introduced into the chamber 11 via the groove 24. Upon reaching a certain pressure, the headed screw 23 is tightened firmly within the filling device and the filling device removed. The adaptor 15 is then threaded into the tapped hole 14 and following attachment to a pipeline, the reservoir is operational.

The liquid reaches the liquid chamber 12 through the liquid connection 17, liquid chamber 18, channels 19 and the passages 6. It should be mentioned that the passages 6 are so dimensioned that the wall or partition 13 cannot be squeezed or forced out through such passages. On the other hand, the passages are so dimensioned that fluid can flow therethrough without noteworthy throttling and as a consequence substantially the same pressure prevails in the liquid chamber 18 as in the liquid chamber 12 and hence in the gas chamber 11. This means that the packing 22 is not stressed.

When the reservoir 1 is emptied of the liquid, the packing 22 is charged by the initial gas tension but this pressure is relatively low and in addition the stress is merely static. When the present pressure reservoir 1 is employed for hydro-pneumatic vehicle suspensions, for example, such a situation will occur only when the wheels are freely suspended from the ground and normally a certain liquid filling is always present.

The present invention is not to be restricted to the precise details of the illustrated embodiment since, for instance, the closure defined by the packing 22 and the headed screw 23 may be replaced by a gas filling valve. However, a fillister headed screw is efficacious in that its head, in combination with a sharp edge, results in an additional metallic sealing effect. Other solutions are also possible with respect to the design and arrangement of the cover, the clamping ring, the nut and the adaptor and it is feasible to combine 2 or more of these components.

I claim:

1. A hydro-pneumatic pressure reservoir including a housing having an opening, a movable pliant partition within the housing dividing the interior thereof into an outer liquid chamber and an inner gas chamber, a clamping ring and cover tightly sealing the opening, said partition being maintained in a liquid and gas tight manner between the ring and cover, said cover having a gas filling aperture through which gas is introduced into the chamber, a closure for the gas filling aperture, said cover being provided with a liquid connection, passages between the housing and the ring, said cover having channels providing communication between the liquid connection and said passages for allowing liquid to enter the liquid chamber, and said closure on the side thereof facing away from the gas chamber terminating in a liquid chamber communicating with at least the liquid connection for pressure equalization purposes.

2. The hydro-pneumatic pressure reservoir as claimed in claim 1 in which the gas filling opening in the area of the liquid chamber is surrounded by a surface to which a filling device is adapted to be tightly attached.

References Cited

UNITED STATES PATENTS

| | | | |
|---|---|---|---|
| 3,209,785 | 10/1965 | Mercier | 138—30 |
| 3,368,586 | 2/1968 | French et al. | 138—30 |

LAVERNE D. GEIGER, Primary Examiner

R. J. SHER, Assistant Examiner